(12) United States Patent
Yu et al.

(10) Patent No.: US 11,706,532 B2
(45) Date of Patent: Jul. 18, 2023

(54) METHOD FOR PROVIDING IMAGE AND ELECTRONIC DEVICE SUPPORTING THE SAME

(71) Applicant: Samsung Electronics Co., Ltd., Gyeonggi-do (KR)

(72) Inventors: Sangjun Yu, Gyeonggi-do (KR); Sungoh Kim, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/736,320

(22) Filed: May 4, 2022

(65) Prior Publication Data

US 2023/0059077 A1 Feb. 23, 2023

Related U.S. Application Data

(63) Continuation of application No. PCT/KR2022/006268, filed on May 2, 2022.

(30) Foreign Application Priority Data

Aug. 18, 2021 (KR) .................. 10-2021-0108816
Oct. 8, 2021 (KR) .................. 10-2021-0133722

(51) Int. Cl.
*H04N 23/70* (2023.01)
*G06T 5/00* (2006.01)
*H04N 23/57* (2023.01)

(52) U.S. Cl.
CPC ............ *H04N 23/70* (2023.01); *G06T 5/007* (2013.01); *H04N 23/57* (2023.01); *G06T 2207/10024* (2013.01)

(58) Field of Classification Search
CPC .......... G06T 2207/10024; G06T 5/007; H04N 23/57; H04N 23/70
See application file for complete search history.

(56) References Cited

U.S. PATENT DOCUMENTS 11,575,865 B2 * 2/2023 Liu ..................... H04N 23/12
2020/0053332 A1 2/2020 Seok
(Continued)

FOREIGN PATENT DOCUMENTS

CN 111953899 A 11/2020
JP 2020-167542 A 10/2020
(Continued)

OTHER PUBLICATIONS

Yuqian Zhou et al. Image Restoration for Under-Display Camera; 13 pages.
(Continued)

*Primary Examiner* — Amy R Hsu
(74) *Attorney, Agent, or Firm* — Cha & Reiter, LLC

(57) ABSTRACT

According to certain embodiments, an electronic device comprises a display; a camera disposed under the display; and a processor configured to, obtain a first image using the camera in a first state in which a first portion of the display corresponding to a position where the camera is disposed is in a first mode, obtain a second image, using the camera in a second state in which the first portion of the display is in a second mode, calculate correction values, based on first data for a first area of the first image and second data for a second area of the second image, wherein the second area of the second image corresponds to the first area of the first image, and correct at least one image among a plurality of images, using the correction values, wherein one of obtain-
(Continued)

ing the first image and obtaining the second image is responsive to the other of obtaining the first image and the second image.

20 Claims, 11 Drawing Sheets

(56) References Cited

U.S. PATENT DOCUMENTS

| | | | |
|---|---|---|---|
| 2020/0137314 A1* | 4/2020 | Miao | H04N 23/631 |
| 2020/0169680 A1* | 5/2020 | Park | H04N 23/682 |
| 2020/0314370 A1 | 10/2020 | Takahashi | |
| 2020/0319682 A1 | 10/2020 | Moon et al. | |
| 2020/0358930 A1* | 11/2020 | Nicholson | G06F 3/04812 |
| 2021/0368085 A1 | 11/2021 | Ou et al. | |
| 2022/0070376 A1* | 3/2022 | Lee | H04N 23/63 |

FOREIGN PATENT DOCUMENTS

| | | |
|---|---|---|
| KR | 10-2006-0131155 A | 12/2006 |
| KR | 10-2020-0060118 A | 5/2020 |
| KR | 10-2020-0117137 A | 10/2020 |
| KR | 10-2021-0078656 A | 6/2021 |
| WO | 2020/133814 A1 | 2/2020 |

OTHER PUBLICATIONS

Digital Goja—White Balance lens Cap; First and last page attached; Sep. 7, 2015; https://www.youtube.com/watch?v=-bOd6EKOj2o.
International Search Repost dated Aug. 5, 2022.

\* cited by examiner (a)

(b)

METHOD FOR PROVIDING IMAGE AND ELECTRONIC DEVICE SUPPORTING THE SAME

CROSS REFERENCE TO RELATED APPLICATIONS

This application is a continuation application, claiming priority under § 365(c), of an International application No. PCT/KR2022/006268, filed on May 2, 2022, which is based on and claims the benefit of a Korean patent application number 10-2021-0108816, filed on Aug. 18, 2021 and a Korean patent application number 10-2021-0133722, filed on Oct. 8, 2021 in the Korean Intellectual Property Office, the disclosure of which is incorporated by reference herein in its entirety.

BACKGROUND

Technical Field

Certain embodiments of the disclosure relate to a method for providing an image and an electronic device supporting the same.

Description of Related Art

An electronic device, such as a smart phone or a tablet PC may include a camera (or a camera module or a camera device) that may capture a photo or a video.

Disposing the camera under the display may degrade the captured image. For example, as light diffraction or scattering is caused by the display panel, some frequency band components may be attenuated, and resolution may be decreased. Further, if a light source is captured, the flare of the starburst effect may be lost. Further, even in the same light source environment, spectral characteristics for each wavelength are varied due to a difference of the state of the camera. The changing of a camera disposed under the display from the off state to the on state can cause the presence of artifacts in the captured image.

Accordingly, it is desirable to prevent the foregoing.

SUMMARY

According to certain embodiments, an electronic device comprises a display; a camera disposed under the display; and a processor configured to, obtain a first image using the camera in a first state in which a first portion of the display corresponding to a position where the camera is disposed is in a first mode, obtain a second image, using the camera in a second state in which the first portion of the display is in a second mode, calculate correction values, based on first data for a first area of the first image and second data for a second area of the second image, wherein the second area of the second image corresponds to the first area of the first image, and correct at least one image among a plurality of images, using the correction values, wherein one of obtaining the first image and obtaining the second image is responsive to the other of obtaining the first image and the second image.

According to certain embodiments, a method for operating an electronic device including a display and a camera disposed under the display, comprises: obtaining a first image using the camera in a first state in which a first portion of the display corresponding to a position where the camera is disposed is in a first mode, obtaining a second image using the camera in a second state in which the first portion of the display is in a second mode, calculating correction values, based on first data for a first area of the first image and second data for a second area of the second image, wherein the second area of the second image corresponds to the first area of the first image, and correcting at least one image among a plurality of images obtained using the camera, using the correction values, wherein one of obtaining the first image and obtaining the second image is responsive to the other of obtaining the first image and the second image.

DETAILED DESCRIPTION

According to certain embodiments, a method for providing an image and an electronic device supporting the same may include estimating an external light source using a difference between captured images. The difference between captured images is depends on the state of the under display camera.

Certain embodiments rapidly perform white balancing according to a difference between captured images. The white balancing may be performed using a front camera (e.g., the camera facing in the same direction as the display of the electronic device). Software processing for white balancing and hardware may be also be simplified in accordance with certain embodiments.

Figure 1:
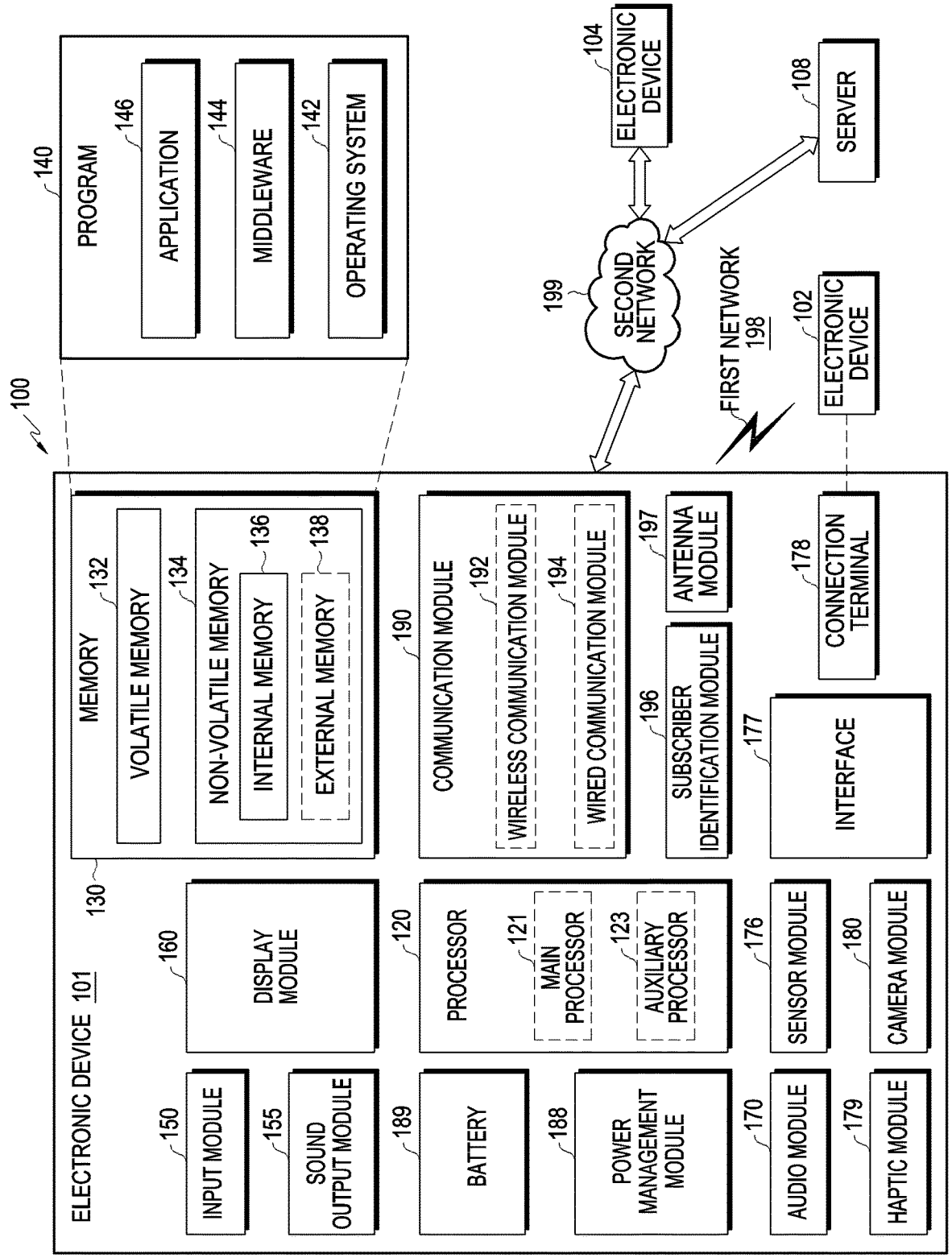
FIG. 1 is a block diagram illustrating an electronic device in a network environment according to certain embodiments.
Figure 2:
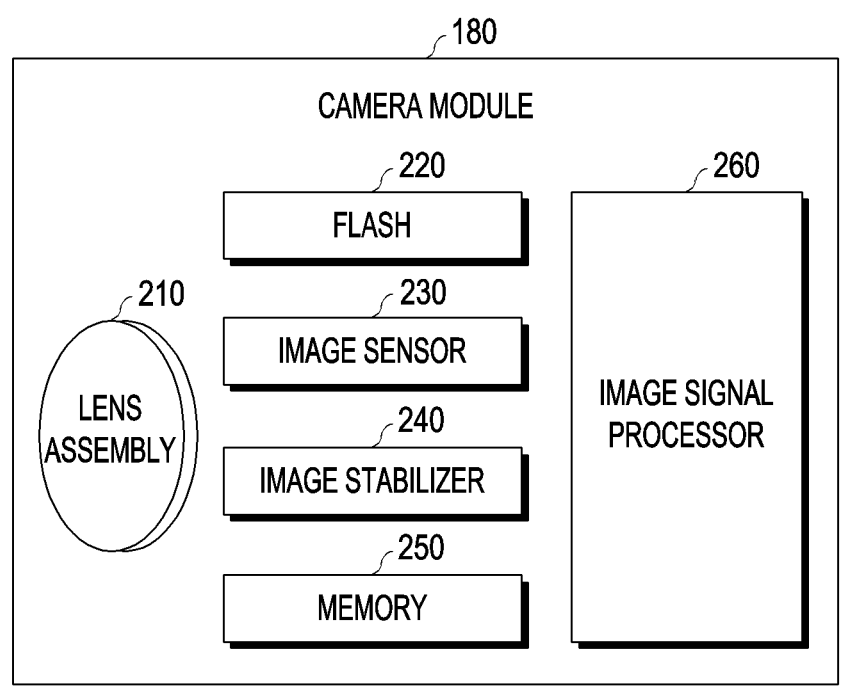
FIG. 2 is a block diagram illustrating a camera module according to an embodiment.
Figure 3:
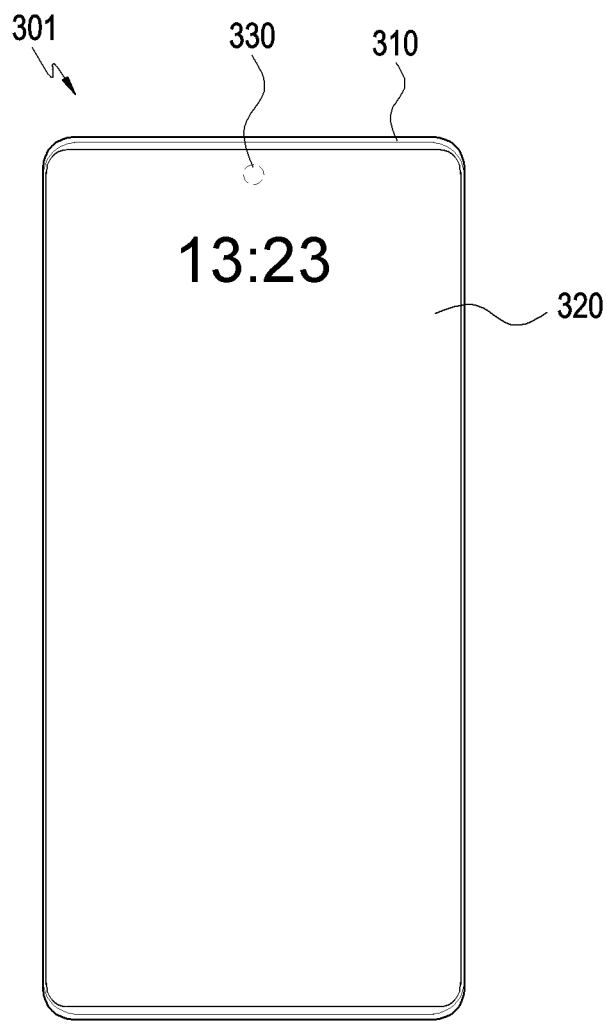
FIG. 3 is a view illustrating an electronic device according to certain embodiments.

FIG. 1 describes an electronic device that includes a camera module 180. FIG. 2 describes the camera module 180. FIG. 3 discloses the housing of the electronic device, wherein the camera module is located under the display.

Electronic Device

FIG. 1 is a block diagram illustrating an electronic device in a network environment according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The term "processor" as used in this document shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device 101 can include a camera module 180 that is configured to capture an image or video of the scene in the vicinity of the electronic device 101. FIG. 2 describes the camera module 180.

Camera Module

FIG. 2 is a block diagram illustrating a camera module according to an embodiment; Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., field of view, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The lens assembly 210 is typically exposed through a surface of the housing in order to be able to capture an image or video of the area proximate to the electronic device. However, exposure of lens assembly 210 to the surface may reduce the display area of the display module 160. Accordingly, to increase the display area, the camera module and lens assembly 210 may be disposed below the display. FIG. 3 discloses an electronic device 101 with an under display camera.

Under Display Camera

FIG. 3 is a view illustrating an electronic device according to certain embodiments, wherein the camera module 330 may be disposed under the display 320.

Disposing the camera under the display may degrade the captured image. For example, as light diffraction or scattering is caused by the display panel, some frequency band components may be attenuated, and resolution may be decreased. Further, if a light source is captured, the flare of the starburst effect may be lost. Further, even in the same light source environment, spectral characteristics for each wavelength are varied due to a difference of the state of the camera. The changing of a camera disposed under the display from the off state to the on state can cause the presence of artifacts in the captured image.

According to certain embodiments, the foregoing may be alleviated, if not prevented or eliminated.

Referring to FIG. 3, according to certain embodiments, an electronic device 301 (e.g., the electronic device 101 of FIG. 1) may include a body unit 310, a display 320 (e.g., the display module 160 of FIG. 1), and a camera module 330 (e.g., the camera module 180 of FIG. 1 or 2). Although FIG. 3 illustrates an example in which one camera module is included, embodiments are not limited thereto.

The body unit (or housing) 310 may include various components necessary for operation of the electronic device 301. For example, the body unit 310 may include various components, such as a board (e.g., a printed circuit board (PCB), a flexible PCB (FPCB), or a rigid-flexible PCB (RFPCB)), a processor (e.g., the processor 120 of FIG. 1), a memory (e.g., the memory 130 of FIG. 1), or a communication module (e.g., the communication module 190 of FIG. 1).

The display 320 may be disposed on a first surface (e.g., front surface) of the body unit 310, and the camera module 330 may be disposed to face the first surface. For example, the camera module 330 may not be visually exposed, and may be a under display camera (UDC).

Although FIG. 3 illustrates an example in which the camera module 330 is disposed to face the first surface (e.g., front surface, a surface where the display 320 is primarily disposed) of the body unit 310, embodiments are not limited thereto. For example, the display 320, in certain embodiments, may extend to a second surface (e.g., rear surface) of the body unit 310, and the camera module 330 may be disposed to face the second surface (e.g., rear surface) of the body unit 310.

The display 320 may display various contents, such as text or images. The display 320 may be composed of a plurality of layers. For example, the display 320 may have a structure in which a window layer, a touchscreen panel, a display panel, and/or a protection layer are sequentially stacked (see FIG. 4).

The display 320 may transmit external light in at least a partial area where the camera module 330 is disposed. For example, the display 320 may transmit external light through an empty space between the pixels included in the display 320. The camera module 330 may capture an image using the external light introduced through the display 320.

The camera module 330 may be mounted in an area where at least some layers included in the display 320 have been removed. For example, a layer (e.g., a shielding layer) through which external light may not be transmitted may be removed, and the lens unit (e.g., the lens unit 331 of FIG. 4) of the camera module 330 may be disposed in the removed area.

A patterned metal layer (hereinafter, pattern layer) may be disposed on the front surface of the lens unit (e.g., the lens unit 331 of FIG. 4) of the camera module 330. For example, the pattern layer (e.g., the pattern layer 410 of FIG. 4) may be a layer constituting the display 320 and be disposed between the pixels of the display panel and the lens unit (see FIGS. 5 and 6).

Figure 4:
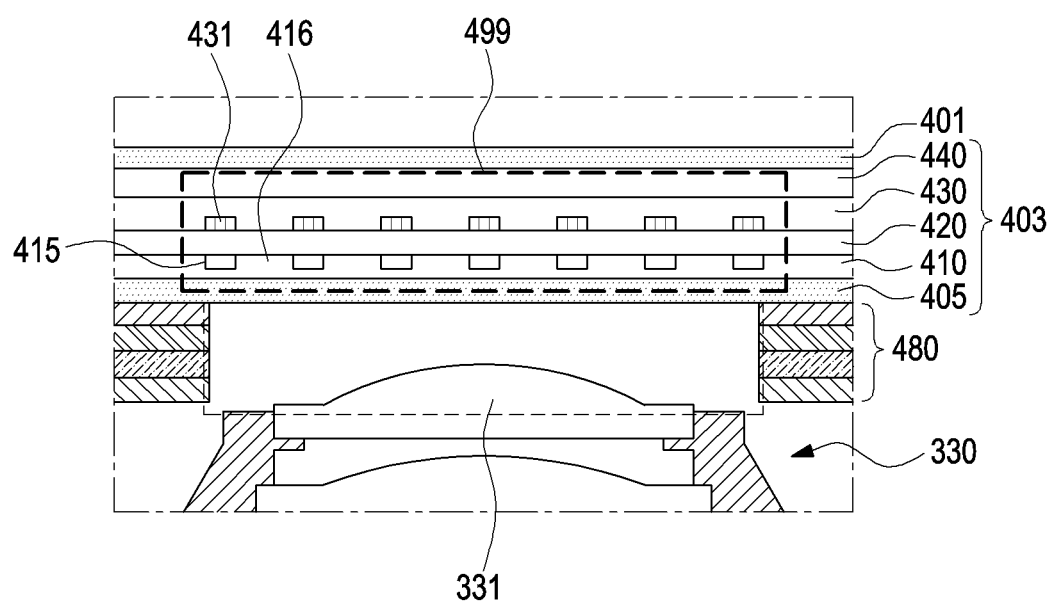
FIG. 4 is a cross-sectional view illustrating a display and a camera module according to certain embodiments.

FIG. 4 is a cross-sectional view illustrating a display and a camera module according to certain embodiments. The camera module of FIG. 4 may be the camera module 330 of FIG. 3. The display of FIG. 4 may be the display 320 of FIG. 3. FIG. 4 is exemplary but embodiments are not limited thereto. The camera module 330 is disposed under the display panel 403.

Referring to FIG. 4, a display (e.g., the display 320 of FIG. 3) may include a window layer 401, a display panel 403, and a protection layer (or shielding layer or back cover) 480. The display panel 403 may include a base layer 405, a pattern layer 410 stacked on the base layer 405. A wiring layer 420 may be stacked on the pattern layer 410. A light emitting layer 430 may be stacked on the wiring layer. An encapsulation layer 440 may be stacked on the light emitting layer 430. The blocking portion 415 blocks light emitted from the pixel 431 from entering the camera module 330.

The protection layer 480 may be formed under the entire display panel 403, except an area that corresponds to the location of the camera module 330. The pattern layer 410 that corresponds to the open area may include blocking portions 415 that correspond to pixels 431 of the light emitting layer 430. However, openings 416 that are between the block portions 415 allow light from the exterior to enter the camera module 330. The window layer (e.g., ultra-thin glass (UTG)) 401 may include a polymer. In this case, the window layer 401 may include polyethylene terephthalate (PET) or polyimide (PI). In certain embodiments, a plurality of window layers 401 may be disposed.

Although not shown in FIG. 4, the display may further include a touch panel (touch sensor) between the window layer 401 and the display panel 403.

The display may include a control circuit (not shown). For example, the control circuit (not shown) may include a display driver IC (DDI) and/or a touch display driver IC (TDDI) disposed in a chip on panel (COP) or chip on film (COF) type.

The electronic device 301 may include a plurality of displays (e.g., first and second displays), and at least one of the plurality of displays may include a flexible characteristic. For example, in the electronic device 301, the first display (e.g., the display 320) may include an on cell touch AMOLED (OCTA) display, and the second display (e.g., a flexible display) may include an unbreakable (UB)-type active matrix organic light-emitting diode (OLED) display.

The display panel 403 may include a base layer 405, a pattern layer 410, a wiring layer 420, a light emitting layer (or organic material layer) 430, and an encapsulation layer (or protection layer) 440. Although not shown in FIG. 2, the display panel 403 may further include a polarization layer (polarizer) (e.g., a polarization film), an adhesive layer, and a touch panel. For example, the adhesive layer, as an adhesive member (e.g., optical clear adhesive (OCA) or pressure sensitive adhesive (PSA)), may be disposed between the layers.

A base layer 405 may be formed in a lower direction (e.g., a direction toward the camera module 330) of the pattern layer 410. For example, the wiring layer 420 and the light emitting layer 430 may be stacked on the base layer 405. According to certain embodiments, the base layer 405 may include a transparent insulation substrate (e.g., a substrate). For example, the base layer 405 may be formed of a glass substrate, a quartz substrate, or a transparent resin substrate. For example, the transparent resin substrate may include a polyimide-based resin, an acryl-based resin, a polyacrylate-based resin, a polycarbonate-based resin, a polyether-based resin, a sulfonic acid-based resin, and/or a polyethylene terephthalate-based resin.

The pattern layer (or bottom metal layer (BML)) 410 may form a pattern in the area where at least a portion of the protection layer (or shielding layer or back cover) 480 has been removed to dispose the camera module 330. The pattern layer 410 may include a blocking portion (or blocking area) 415 and an opening (or an open area) 416. The blocking portion 415 may be an area at least partially corresponding to the pixel 431 of the light emitting layer (organic layer) 430, and the opening 416 may be an area at least partially corresponding to the panel opening between the pixels 431 of the light emitting layer (organic layer) 430. According to an embodiment, the pattern layer 410 may be formed of a metal material and be formed under the wiring layer 420 by deposition and/or patterning. The pattern layer 410 may protect the pixel 431 of the light emitting layer (organic layer) 430 and block the light generated from the pixel 431. According to certain embodiments, the pattern layer 410 may include a designated pattern (black matrix) or an opaque metal layer (e.g., buffer layer) including designated patterns, to reduce diffraction of the light introduced to the camera module 330.

The external light transmitted through the opening 416 may be introduced to the lens unit 331. For example, light may be diffracted or scattered depending on the shape or size of the opening 416.

The wiring layer 420 and the light emitting layer 430 may be formed by depositing a light emitting element (e.g., organic electroluminescence (EL)) on a thin film transistor (TFT) substrate. According to certain embodiments, the light emitting layer 430 may include a plurality of pixels 431 in which a plurality of subpixels (e.g., red, green, and blue) constitute one pixel. According to certain embodiments, the display panel 403 may include an active area (e.g., a display area) and an inactive area (e.g., a non-display area). For example, the active area may correspond to an area in which the plurality of pixels 431 are disposed, and the inactive area may be disposed outside the active area and correspond to the bezel area of the display panel 403.

The wiring layer 420 may include a TFT element for driving each pixel of the active area, a metal wiring, or an insulation film. According to certain embodiments, the wiring layer 420 may include a liquid crystal polymer (LCP), low temperature polycrystalline silicon (LTPS), or low temperature polycrystalline oxide (LTPO) glass, and the plurality of pixels may include thin film transistors (TFTs) formed on the LTPS glass.

The light emitting layer 430 may include a light emitting element (e.g., organic EL). Organic EL may generate light when holes and electrons are injected from a positive electrode (cathode) and a negative electrode (anode).

When the display panel 403 is viewed from above the first surface (e.g., front surface), in an area at least partially overlapping at least one component (e.g., the camera module 330 or a sensor module (e.g., the sensor module 176 of FIG. 1)) included in the electronic device 301, the plurality of pixels may not be disposed or a plurality of pixels with a lower arrangement density than the non-overlapping area may be included.

The encapsulation layer 440 (e.g., thin film encapsulation (TFE)) may be a layer in which organic materials and inorganic materials are alternately formed on the light emitting layer 430 to protect the light emitting element from oxygen or moisture. For example, the encapsulation layer 440 may be a pixel protection layer to protect the plurality of pixels 431. For example, the encapsulation layer 440 may include an encapsulation glass.

The protection layer (or shielding layer) 480 may support and protect the display panel 403. The protection layer 480 may block light or electromagnetic waves, introduced from the display panel 403, from entering the electronic device 301. The protection layer 480 may include a black film and a metal (e.g., copper) plate. For example, the protection layer 480 may be disposed under the display panel 403, thereby providing a dark background for securing the visibility of the display panel 403. The protection layer 480 may be formed of a shock absorbing member (e.g., cushion) for cushioning. For example, the protection layer 480 may include an opaque metal layer (e.g., a black layer including an uneven pattern) for blocking light incident from the outside or light generated by the display panel 403 and removing air bubbles that may build up between the display panel 403 and its underneath attachments and/or a cushioning layer (e.g., a sponge layer) disposed to mitigate shocks.

The protection layer 480 may include a heat dissipation member (e.g., a graphite sheet) for heat dissipation and/or a conductive member (e.g., a metal plate). For example, the conductive member may help to reinforce the rigidity of the electronic device 301, shield ambient noise, and dissipate the heat radiated from the ambient heat radiating components.

The protection layer 480 may be at least partially open, and the lens unit 331 may be disposed in the open area. In the area where the protection layer 480 has been removed, the pattern of the pattern layer 410 may be formed.

Referring to FIG. 4, according to certain embodiments, the light emitted from an external light source and transmitted through a portion (e.g., the first portion 499) of the display 320 (e.g., the display panel 403) may reach the lens unit 331 and be used for image capturing. For example, the first portion 499 of the display 320 (e.g., the display panel 403) may mean an area corresponding to the area in which the camera module 330 (e.g., the lens unit 331) is disposed in the display panel 403. For example, the electronic device 301 may obtain an image using the light emitted from the light source and introduced through the first portion 499 of the display panel 403.

The electronic device 301 (e.g., the processor 120 of the electronic device 101 of FIG. 1 or the image signal processor 260 of FIG. 2) may control a portion (e.g., the first portion 499) of the display 320. For example, 'electronic device 301 controls the first portion 499 of the display 320' may mean controlling at least a partial area of the light emitting layer 430 and/or the wiring layer 420 of the display panel 403, included in the first portion 499. For example, 'electronic device 301 controls the first portion 499 of the display 320' may mean controlling at least one pixel (e.g., the pixel 431) included in the first portion 499 among the plurality of pixels (e.g., pixel 431) of the electronic device 301. For example, the electronic device 301 may control the first portion 499 of the display 320 to display a screen in the first portion 499 of the display 320. The state in which a screen is displayed in the first portion 499 of the display 320 may be referred to as an active state (or under display camera (UDC)-On state). For example, in the state in which the first portion 499 of the display 320 is active (e.g., the UDC-On state), the electronic device 301 may obtain an image using the camera module 330. As another example, the electronic device 301 may control the first portion 499 of the display 320 to display no screen in the first portion 499 of the display 320. The state in which no screen is displayed in the first portion 499 of the display 320 may be referred to as an inactive state (or under display camera (UDC)-Off state). For example, in the state in which the first portion 499 of the display 320 is inactive (e.g., the UDC-Off state), the electronic device 301 may obtain an image using the camera module 330.

Figure 5:
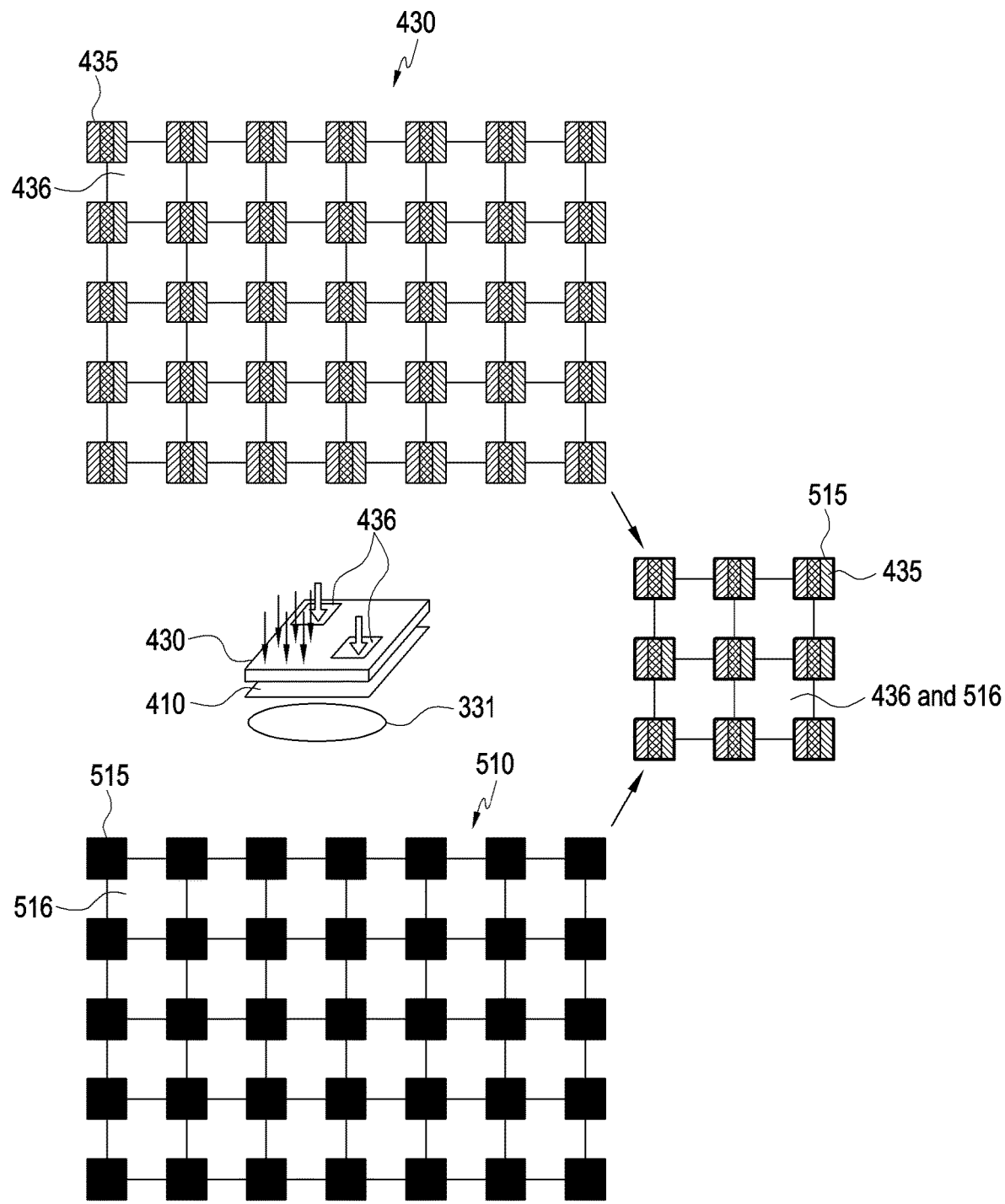
FIG. 5 illustrates a pixel structure and a pattern disposed adjacent to a camera module according to certain embodiments.

FIG. 5 illustrates a pixel structure and a pattern disposed adjacent to a camera module according to certain embodiments.

The light emitting layer 430 may include pixel areas 435 and panel openings 436. The pixel areas 435 are areas where the pixels are disposed. The panel openings 436 are areas between the pixel areas 435. On the display, the blocking portions 515 are disposed to be directly under the pixel areas 435 in the area that corresponds to the camera module 330. Accordingly, light from the pixels is blocked by the blocking portions 515, while light passes through the panel openings 436.

Referring to FIG. 5, according to certain embodiments, the light emitting layer 430 may include pixel areas 435 in which pixels is disposed and panel openings 436. The pixel area 435 may be areas having pixels configured as light emitting elements (e.g., organic electro luminescence (EL)). The panel opening 436 may be empty spaces between pixel areas 435. The panel openings 436 may have various shapes. For example, panel openings 436 may be cross-shaped polygons. As another example, the panel openings 436 may have rectangular shapes, but are not limited to a specific shape. The panel opening 436 may transmit or permit the light introduced from the outside, and the transmitted light may reach the lens unit 331 and be used for image capturing.

A pattern portion 510 of the pattern layer 410 may include a blocking portion 515 and an opening 516. The blocking portion 515 may be an area corresponding to the pixel area 435, and the opening 516 may be an area corresponding to the panel opening 436.

The blocking portion 515 may prevent the light generated from the pixel area 435 from entering the lens unit 331. The opening 516 may transmit the light transmitted through the panel opening 436.

The blocking portions 515 may have substantially the same shapes and sizes as the pixel areas 435. For example, the blocking portions 515 and the pixel areas 435 may have rectangular shapes in substantially the same size. According to another embodiment, the blocking portions 515 may have substantially the same shapes as, but different sizes from, the pixel areas 435. For example, the blocking portions 515 and the pixel areas 435 may have rectangular shapes, and the sizes of the blocking portions 515 may be larger than the sizes of the pixel areas 435. According to another embodiment, the blocking portions 515 may have a different shape from the pixel areas 435, and the blocking portions 515 and the pixel areas 435 are not limited in shape.

The openings 516 may have substantially the same shapes and sizes as the panel openings 436. For example, the opening 516 and the panel opening 436 may be cross-shaped polygons in substantially the same size. According to another embodiment, the opening 516 may have substantially the same shape as, but a different size from, the panel opening 436. For example, the opening 516 and the panel opening 436 may be cross-shaped polygons, and the size of the opening 516 may be smaller than the size of the panel opening 436. According to another embodiment, the opening 516 may have a different shape from the panel opening 436, but the opening 516 and the panel opening 436 are not limited in shape.

According to certain embodiments, the blocking portions 515 and the openings 516 may be disposed on the front surface of the lens unit 331. The light transmitted through the panel openings 436 and the openings 516 may reach the lens unit 331 and be used for image capturing.

Figure 6:
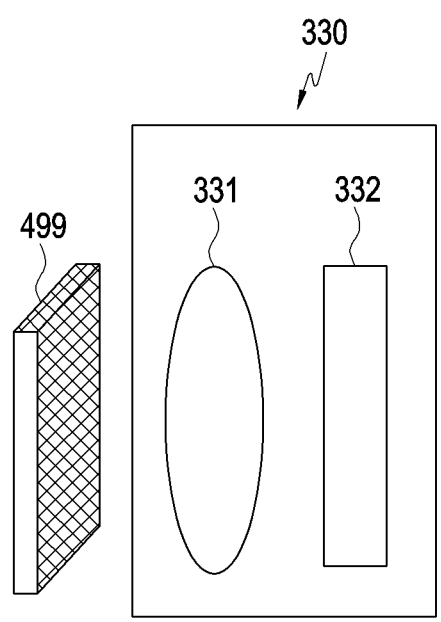
FIG. 6 is a view illustrating a partial configuration of a display and a camera module according to certain embodiments.
Figure 7:
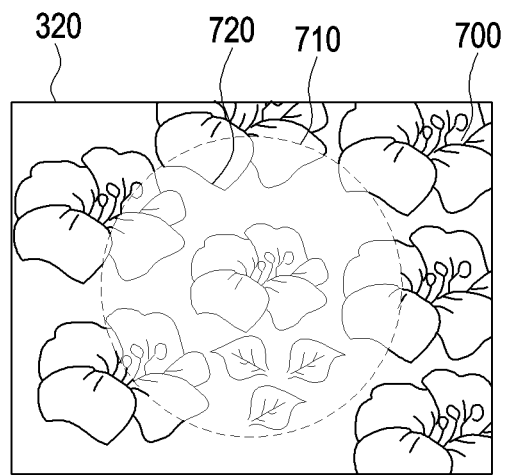
FIG. 7 is a view illustrating operations of an electronic device according to certain embodiments.
Figure 7:
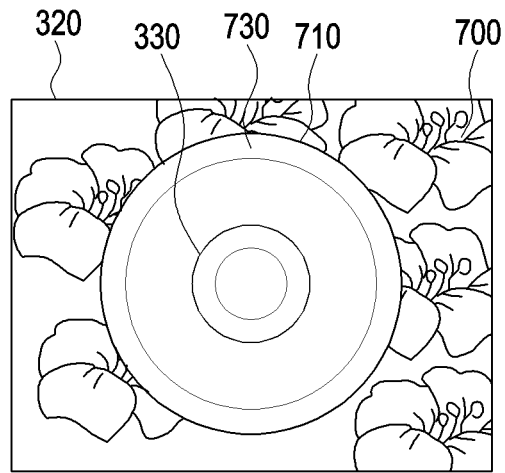
Figure 8:
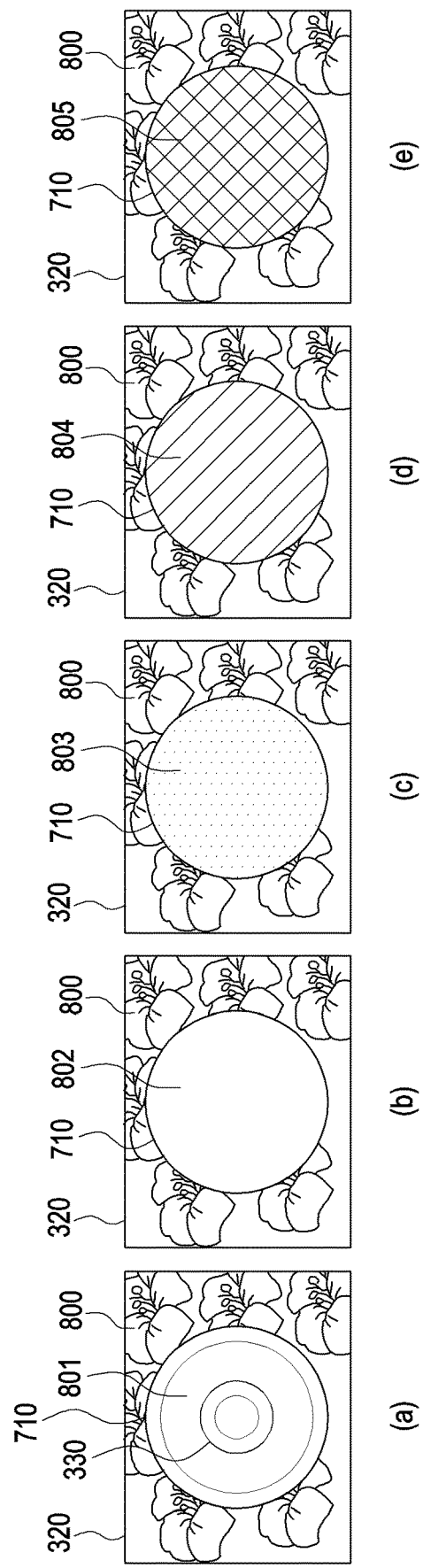
FIG. 8 is a view illustrating operations of an electronic device according to certain embodiments.

FIG. 6 is a view illustrating a partial configuration of a display and a camera module according to certain embodiments. FIG. 6 is described with reference to FIGS. 7 and 8. FIG. 7 is a view illustrating operations of an electronic device according to certain embodiments. FIG. 8 is a view illustrating operations of an electronic device according to certain embodiments.

The first portion 499, the portion of the display that is disposed over the camera module 330 blocks light from the pixels from entering the lens assembly 331, while permitting light through the panel openings 436.

Referring to FIG. 6, according to certain embodiments, the electronic device 301 (e.g., the processor 120 of the electronic device 101 of FIG. 1 or the image signal processor 260 of FIG. 2) may control the lens unit 331 of the camera module 330, the image sensor 332, and/or a portion (e.g., the first portion 499) of the display 320 (e.g., the display panel 403) to obtain an image. For example, the electronic device 301 may control the first portion 499 of the display 320 to display a screen in the first portion 499 of the display 320 (e.g., active state or UDC-On state) or to display no screen (e.g., inactive state or UDC-Off state). For example, the camera module 330 may collect the light transmitted through the first portion 499, through the lens unit 331 in the UDC-On state or UDC-Off state. The image sensor 332 may convert the light collected through the lens unit 331 into an electrical signal.

Referring to FIG. 7, according to certain embodiments, the electronic device 301 (e.g., the processor 120 of the electronic device 101 of FIG. 1 or the image signal processor 260 of FIG. 2) may display a first screen 700 using the display 320. For example, the electronic device 301 may control at least one pixel among the plurality of pixels included in the display panel 403 to display a screen.

The first screen 700 may include a first portion 710 that corresponds to the location of the camera module 300. In the UDC-On state, (a) of FIG. 7, the first portion 710 displays content. In the UDC-Off state, (b) of FIG. 7, the first portion 710 does not display content, thereby resulting in an empty content area above the camera module 330.

In (a) and (b) of FIG. 7, a first portion 710 (e.g., the first portion 499 of FIG. 4) of the display 320 may be a portion corresponding to the position in which the camera module 330 is disposed, which has been described above in connection with the first portion 499 of FIG. 4.

Referring to (a) of FIG. 7, the electronic device 301 may display the first screen 700 using the display 320. For example, the electronic device 301 may display a first partial screen 720, as a partial area of the first screen 700, in the first portion 710 (e.g., the first portion 499 of FIG. 4). The "partial screen" may mean a screen displayed in the first portion 710 of the display 320 of the electronic device 301. For example, the first partial screen 720 may form a portion of the first screen 700. For example, the first screen 700 may include the first partial screen 720. For example, the first partial screen 720 and the first screen 700 overall may form one screen, and the border between the first partial screen 720 and the first screen 700 may be imperceptible with the naked eye. In (a) of FIG. 7, the state in which a partial screen (e.g., the first partial screen 720) is displayed in the first portion 710 of the display 320 may mean the above-described UDC-On state. It is noted that in (a) of FIG. 7, the first portion 710 is drawing dimmer to allow the reader to more easily discern the first portion 710. However, the dimmer drawing shall not be understood to suggest that the content on the display is dimmer.

Referring to (b) of FIG. 7, the electronic device 301 may display the first screen 700 using the display 320. For example, the electronic device 301 may control the first portion 710 (e.g., the first portion 499 of FIG. 4) of the display 320 to display no screen in the first portion 710 (e.g., the first portion 499 of FIG. 4) of the display 320. For example, the electronic device 301 may display a first screen 700 using the display 320 and may display no screen in the first portion 710 of the display 320. Or, the electronic device 301 may control the display 320 to display no screen in the entire area of the display 320. The state 730 in which no screen is displayed in the first portion 710 of the display 320 may mean the above-described UDC-Off state. (b) of FIG. 7 discloses an embodiment in which in the state in which no screen is displayed in the first portion 710 of the display 320, the camera module 330 disposed under the display 320 is identified with the naked eye through the first portion 710 of the display 320. However, this is merely an example, and the display 320 may be implemented so that the camera module 330 disposed under the display 320 is not identified with the naked eye even in the state in which no screen is displayed in the first portion 710 of the display 320.

In certain embodiments, in the UDC-off state, the first portion 710 may have less brightness or luminance as compared to the UDC-on state.

Referring to FIG. 8, according to certain embodiments, the electronic device 301 (e.g., the processor 120 of the electronic device 101 of FIG. 1 or the image signal processor 260 of FIG. 2) may display a first screen 800 using the display 320. According to certain embodiments, the electronic device 301 may control the first portion 710 (e.g., the first portion 499 of FIG. 4) of the display 320 to display a screen, or no screen, in the first portion 710 of the display 320.

For example, (a) of FIG. 8 illustrates an embodiment (801) in which the electronic device 301 displays no screen in the first portion 710 of the display 320.

As another example, (b) of FIG. 8 illustrates an embodiment (802) in which the electronic device 301 displays a first partial screen (e.g., a white screen) in the first portion 710 of the display 320.

As another example, (c) of FIG. 8 illustrates an embodiment (803) in which a second partial screen (e.g., a red screen) in the first portion 710 of the display 320.

As another example, (d) of FIG. 8 illustrates an embodiment (804) in which a third partial screen (e.g., a green screen) in the first portion 710 of the display 320.

As another example, (e) of FIG. 8 illustrates an embodiment (805) in which a fourth partial screen (e.g., a blue screen) in the first portion 710 of the display 320.

According to an embodiment, the electronic device 301 may change the mode of the first portion 710 (e.g., the first portion 499 of FIG. 4) of the display 320. The mode of the first portion 710 (e.g., the first portion 499 of FIG. 4) of the display 320 may mean a state in which no screen is displayed in the first portion 710 (e.g., the first portion 499 of FIG. 4) of the display 320, or a partial screen (e.g., the first partial screen, the second partial screen, the third partial screen, or the fourth partial screen) is displayed in the first portion 710 (e.g., the first portion 499 of FIG. 4) of the display 320. For example, the electronic device 301 may change a first mode in which no screen is displayed in the first portion 710 of the display 320 into a second mode in which the first partial screen (e.g., a white screen) is displayed in the first portion 710. As another example, the electronic device 301 may change a first mode in which the first partial screen (e.g., a white screen) is displayed in the first portion 710 of the display 320 into a second mode in which the second partial screen (e.g., a red screen) is displayed in the first portion 710.

FIG. 8 is a view illustrating the electronic device 301 is able to display no screen in the first portion 710 of the display 320 ((a) of FIG. 8) or to display various partial screens. It will be appreciated by one of ordinary skill in the art that the screen which may be displayed in the first portion 710 of the display 320 is not limited to the example disclosed in FIG. 8.

Figure 9:
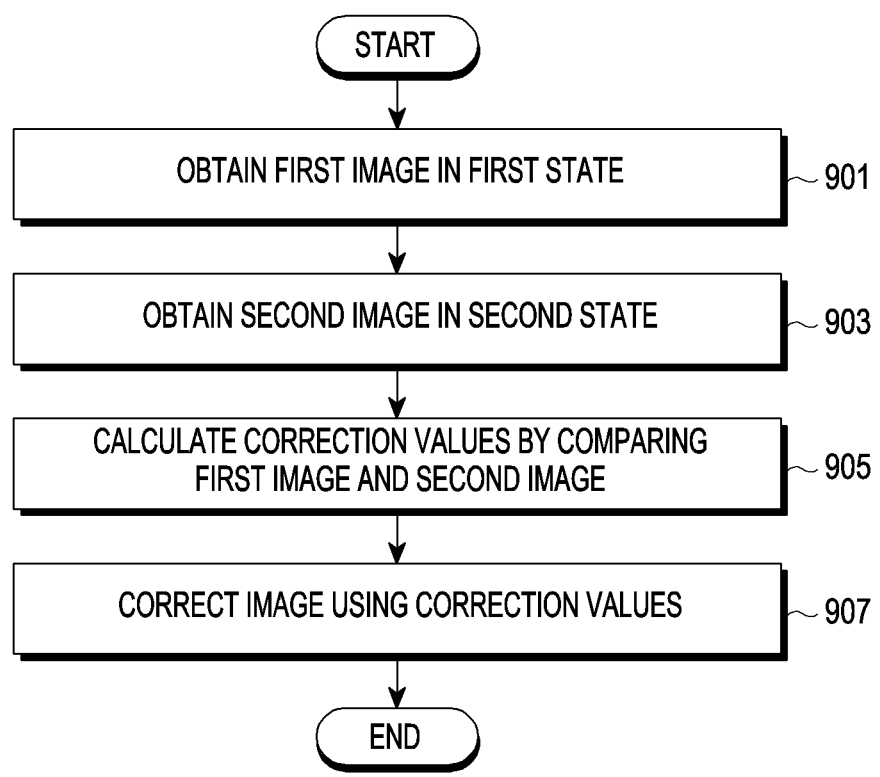
FIG. 9 is a flowchart illustrating operations of an electronic device according to certain embodiments.

FIG. 9 is a flowchart illustrating operations of an electronic device according to certain embodiments. FIG. 9 is described with reference to FIGS. 4 and 7.

Referring to FIG. 9, in operation 901, according to certain embodiments, the electronic device 301 (e.g., the processor 120 of the electronic device 101 of FIG. 1 or the image signal processor 260 of FIG. 2) may obtain a first image using the camera module 180 in a first state in which the first portion (e.g., the first portion 499 or the first portion 710) of the display 320 is in the first mode. For example, in the first state, the first portion of the display 320 may be in the UDC-On state as shown in (a) of FIG. 7.

In operation 903, according to certain embodiments, the electronic device 301 may obtain a second image using the camera module 180 in a second state in which the first portion (e.g., 499 or 710) of the display 320 is in the second mode. For example, after obtaining the first image using the camera module 180 in the first state in which no screen is displayed in the first portion (e.g., 499 or 710) of the display 320, the electronic device 301 may obtain the second image using the camera module 180 in the second state in which a partial screen (e.g., one screen of a white screen, a red screen, a green screen, or a blue screen) is displayed in the first portion (e.g., 499 or 710) of the display 320. For example, in the second state, the first portion of the display 320 may be in the UDC-off state as shown in (b) of FIG. 7, or any of the states of FIG. 8. As another example, after obtaining the first image using the camera module 180 in the first state in which a partial screen (e.g., one screen of a white screen, a red screen, a green screen, or a blue screen, or a screen in which the left semi circle is in a first color (e.g., blue) and the right circle is in a second color (e.g., red)) is displayed in the first portion (e.g., 499 or 710) of the display 320, the electronic device 301 may obtain the second image using the camera module 180 in the second state in which another partial screen (e.g., one screen of a white screen, a red screen, a green screen, or a blue screen) is displayed in the first portion (e.g., 499 or 710) of the display 320. The method of configuring the partial screens is exemplary, and the type of the partial screen is not limited.

In certain embodiments, the first image and the second image may be captured contemporaneously with each other. For example, the second image may be captured in response to capturing the first image. In certain embodiments, the first image and the second image may be captured within a time frame, such that an image captured of the scene that is proximate to the electronic device 101 is not expected to be perceptibly different. In certain embodiments, the first image and the second image may be captured within 1 second of each other. In certain embodiments, the first image and the second image may be captured within 3 seconds of each other.

In operation 905, according to certain embodiments, the electronic device 301 may calculate correction values based on the first image obtained in the first state and the second image obtained in the second state. For example, the electronic device 301 may calculate the correction values by comparing the first image and the second image. That the electronic device 301 compares the first image and the second image may mean comparing data of at least a partial area (e.g., the entire area or a partial area) of the first image and data of at least a partial area of the second image. For example, the electronic device 301 may compare the data of the first area of the first image and the data of the second area of the second image corresponding to the first area of the first image. For example, the electronic device 301 may compare the data of the same areas (or corresponding areas) (e.g., center areas, first quadrant areas, or upper areas) in the first image and the second image, and the method of configuring the areas used for data comparison is not limited. For example, the electronic device 301 may compare the data of the center area of the first image and the data of the center area of the second image. For example, the data of the partial area of the image may include the red (R) level, green (G) level, and blue (B) level of the partial area of the image. For example, the electronic device 301 may compare the R level, G level, and B level of the first area of the first image and the R level, G level, and B level of the second area of the second image corresponding to the first area of the first image. For example, the electronic device 301 may calculate the correction values (e.g., gain used for white balancing) based on the data of the first area of the first image and the data of the second area of the second image corresponding to the first area of the first image. For example, the electronic device 301 may compare the R level, G level, and B level of the first area (e.g., center area) of the first image and the R level, G level, and B level of the second area (e.g., center area) of the second image corresponding to the first area of the first image, calculating the gain (e.g., R gain, G gain, and/or B gain) used for white balancing. The method of calculating the correction values using the first data of the first image and the second data of the second image by the electronic device 301 and the type of data and correction values are not limited.

According to an embodiment, the electronic device 301 may extract data corresponding to any color (e.g., gray) from one input image (e.g., the first image or the second image) and calculate the gain for equally adjusting the R level, G level, and B level of the extracted data. For example, it is possible to perform white balancing by extracting the data corresponding any color (e.g., gray) of the entire area of one input image (e.g., first image or second image) using a light source estimation scheme and/or a gray detection scheme.

According to an embodiment, the electronic device 301 may also calculate the gain for equally adjusting the R level, G level, and B level for the area corresponding to gray, under the assumption that data corresponding to gray is present in one input image (e.g., first image or second image). For example, the electronic device 301 may also calculate the gain for equally adjusting the R level, G level, and B level for the area corresponding to gray by analyzing one input image (e.g., first image or second image) captured for the lens cap or gray card present in front of the camera module 180.

In operation 907, according to certain embodiments, the electronic device 301 may correct at least one image among a plurality of images obtained using the camera module 180 using correction values (e.g., correction values calculated in operation 905). For example, the electronic device 301 may adjust the white balance of at least one image among a plurality of images using the correction values (e.g., R gain, G gain, and/or B gain). For example, the electronic device 301 may correct the image used for calculation of the correction values (e.g., one image of the first image or second image obtained in operation 901 or 903), using the correction values. As another example, the electronic device 301 may correct another image distinguished from the first image and second image obtained in operations 901 and 903, using the correction values.

Although FIG. 9 illustrates image white balancing, the embodiments are not limited to white balancing. According to an embodiment, the electronic device 301 may enhance the image quality using a scheme other than the above-described white balancing and, to that end, may compare the first image obtained in the first state disclosed in operation 901 and the second image obtained in the second state disclosed in operation 903.

According to an embodiment, the electronic device 301 may calculate the color temperature of the external light source by comparing the first image and the second image and correct at least one image using the color temperature of the external light source.

Figure 10:
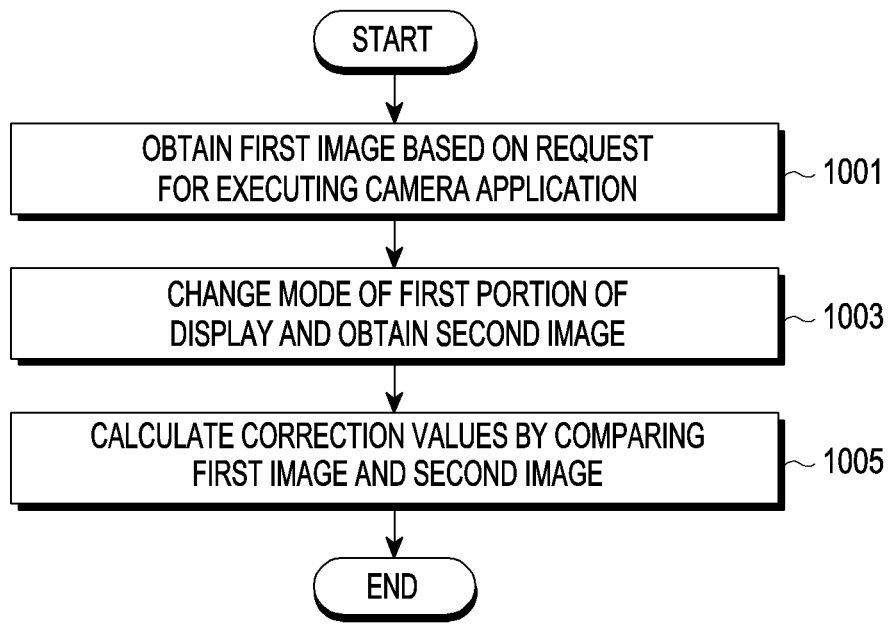
FIG. 10 is a flowchart illustrating operations of an electronic device according to certain embodiments.

FIG. 10 is a flowchart illustrating operations of an electronic device according to certain embodiments. FIG. 10 is described with reference to FIGS. 4 and 7.

Referring to FIG. 10, in operation 1001, according to certain embodiments, the electronic device 301 (e.g., the processor 120 of the electronic device 101 of FIG. 1 or the image signal processor 260 of FIG. 2) may obtain a first image using the camera module 330 in a first state (e.g., active state or UDC-On state) in which the first portion (e.g., 499 or 710) of the display 320 is in a first mode (e.g., a mode in which a partial screen is displayed), based on a request for executing a camera application. For example, the electronic device 301 may display a first screen using the display 320 before the request for executing the camera application is identified and, as the request for executing the camera application is identified, may obtain the first image using the camera module 330 in the state of displaying the partial screen corresponding to a portion of the first screen in the first portion (e.g., 499 or 710) of the display 320.

In operation 1003, according to certain embodiments, the electronic device 301 may change the mode of the first portion (e.g., 499 or 710) of the display 320 and may obtain the second image using the camera module 330 in the second state (e.g., inactive state or UDC-Off state) in which the first portion (e.g., 499 or 710) of the display 320 is in the second mode (e.g., a mode in which no partial screen is displayed). For example, after obtaining the first image in operation 1001 as the request for executing the camera application is identified, the electronic device 301 may obtain the second image using the camera module 330 in the state in which no screen is displayed in the first portion (e.g., 499 or 710) of the display 320 before the camera application is executed. As another example, after obtaining the first image in operation 1001 as the request for executing the camera application is identified, the electronic device 301 may obtain the second image using the camera module 330 in the state in which no screen is displayed in the first portion (e.g., 499 or 710) of the display 320 while the camera application is running. As another example, after obtaining the first image in operation 1001 as the request for executing the camera application is identified, the electronic device 301 may obtain the second image using the camera module 330 in the state in which no screen is displayed in the first portion (e.g., 499 or 710) of the display 320 after the camera application is executed.

In certain embodiments, the first image and the second image may be captured contemporaneously with each other. For example, the second image may be captured in response to capturing the first image. In certain embodiments, the first image and the second image may be captured within a time frame, such that an image captured of the scene that is proximate to the electronic device 101 is not expected to be perceptibly different. In certain embodiments, the first image and the second image may be captured within 1 second of each other. In certain embodiments, the first image and the second image may be captured within 3 seconds of each other.

In operation 1005, according to certain embodiments, the electronic device 301 may calculate the correction values by comparing the first image and the second image, which has been described in connection with operation 905.

Figure 11:
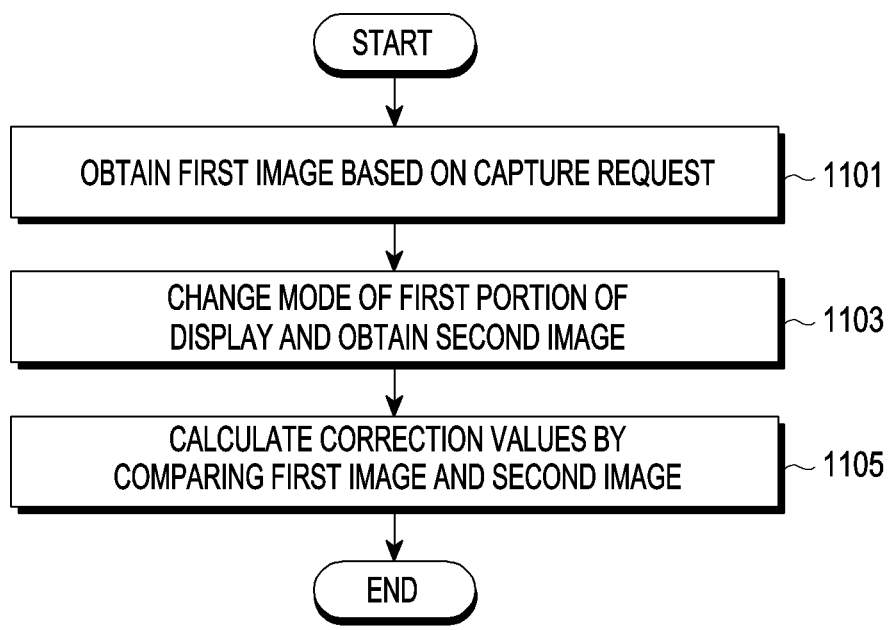
FIG. 11 is a flowchart illustrating operations of an electronic device according to certain embodiments.

FIG. 11 is a flowchart illustrating operations of an electronic device according to certain embodiments. FIG. 11 is described with reference to FIGS. 4 and 7.

Referring to FIG. 11, in operation 1101, according to certain embodiments, the electronic device 301 (e.g., the processor 120 of the electronic device 101 of FIG. 1 or the image signal processor 260 of FIG. 2) may obtain a first image using the camera module 330 in a first state (e.g., inactive state or UDC-Off state) in which the first portion (e.g., 499 or 710) of the display 320 is in a first mode (e.g., a mode in which no partial screen is displayed), based on a capture request. For example, while the camera application is running, and before no capture request is identified, the electronic device 301 may obtain the first image using the camera module 330 as a capture request is identified in the state in which no screen is displayed in the first portion (e.g., 499 or 710) of the display 320 (e.g., inactive state or UDC-Off state).

In operation 1103, according to certain embodiments, the electronic device 301 may change the mode of the first portion (e.g., 499 or 710) of the display 320 and may obtain the second image using the camera module 330 in the second state (e.g., active state or UDC-On state) in which the first portion (e.g., 499 or 710) of the display 320 is in the second mode (e.g., a mode in which a partial screen is displayed). For example, after obtaining the first image in operation 1101 as a capture request is identified, the electronic device 301 may display a partial screen (e.g., one of a white screen, a red screen, a green screen, or a blue screen) in the first portion (e.g., 499 or 710) of the display 320 and obtain the second image using the camera module 330 in the state of displaying the partial screen.

In certain embodiments, the first image and the second image may be captured contemporaneously with each other. For example, the second image may be captured in response to capturing the first image. In certain embodiments, the first image and the second image may be captured within a time frame, such that an image captured of the scene that is proximate to the electronic device 101 is not expected to be perceptibly different. In certain embodiments, the first image and the second image may be captured within 1 second of each other. In certain embodiments, the first image and the second image may be captured within 3 seconds of each other.

According to an embodiment, after obtaining the second image, the electronic device 301 may change the mode of the first portion (e.g., 499 or 710) of the display 320 into the first mode (e.g., a mode in which no partial screen is displayed) in operation 1103.

In operation 1105, according to certain embodiments, the electronic device 301 may calculate the correction values by comparing the first image and the second image, which has been described in connection with operation 905.

According to an embodiment, the electronic device 301 may correct the first image obtained in operation 1101, using the correction values calculated in operation 1105. According to another embodiment, the electronic device 301 may correct at least one image obtained later, using the correction values calculated in operation 1105.

Figure 12:
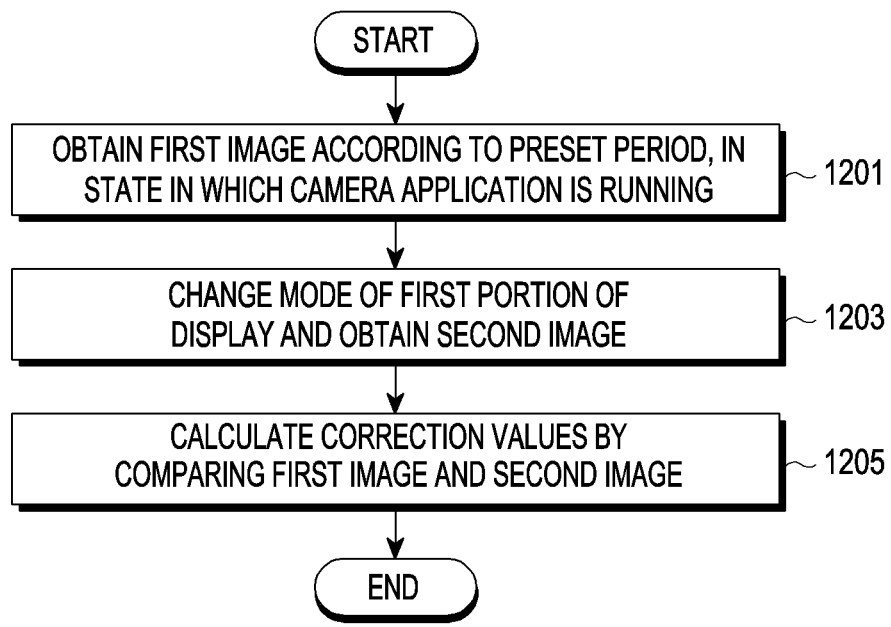
FIG. 12 is a flowchart illustrating operations of an electronic device according to certain embodiments.

FIG. 12 is a flowchart illustrating operations of an electronic device according to certain embodiments. FIG. 12 is described with reference to FIGS. 4 and 7.

Referring to FIG. 12, in operation 1201, according to certain embodiments, the electronic device 301 (e.g., the processor 120 of the electronic device 101 of FIG. 1 or the image signal processor 260 of FIG. 2) may obtain the first image according to a designated period while the camera application is running. For example, the electronic device 301 may obtain the first image using the camera module 330 in the first state (e.g., inactive state or UDC-Off state) in which the first portion (e.g., 499 or 710) of the display 320 is in the first mode (e.g., a mode in which no partial screen is displayed) according to the preset period in the state in which the camera application is running.

In operation 1203, according to certain embodiments, immediately after performing operation 1201, the electronic device 301 may change the mode of the first portion (e.g., 499 or 710) of the display 320 and may obtain the second image using the camera module 330 in the second state (e.g., active state or UDC-On state) in which the first portion (e.g., 499 or 710) of the display 320 is in the second mode (e.g., a mode in which a partial area is displayed). For example, after obtaining the first image in operation 1201 according to the designated period in the state in which the camera application is running, the electronic device 301 may display a partial screen (e.g., one of a white screen, a red screen, a green screen, or a blue screen) in the first portion (e.g., 499 or 710) of the display 320 and obtain the second image using the camera module 330 in the state of displaying the partial screen.

According to an embodiment, after obtaining the second image, the electronic device 301 may change the mode of the first portion (e.g., 499 or 710) of the display 320 into the first mode (e.g., a mode in which no partial screen is displayed) in operation 1203.

In operation 1205, according to certain embodiments, the electronic device 301 may calculate the correction values by comparing the first image and the second image, which has been described in connection with operation 905.

According to an embodiment, the electronic device 301 may correct at least one image obtained later, using the correction values calculated in operation 1205. For example, the electronic device 301 may periodically calculate the correction values through operation 1201, operation 1203, and operation 1205 and, if calculating first correction values at a first time according to a period, correct at least one image among a plurality of images obtained between the first time and a second time using the first correction values until before calculating second correction values at the second time according to a next period. Thereafter, if calculating the second correction values at the second time, the electronic device 301 may correct at least one image among the plurality of images obtained after the second time using the second correction values.

Figure 13:
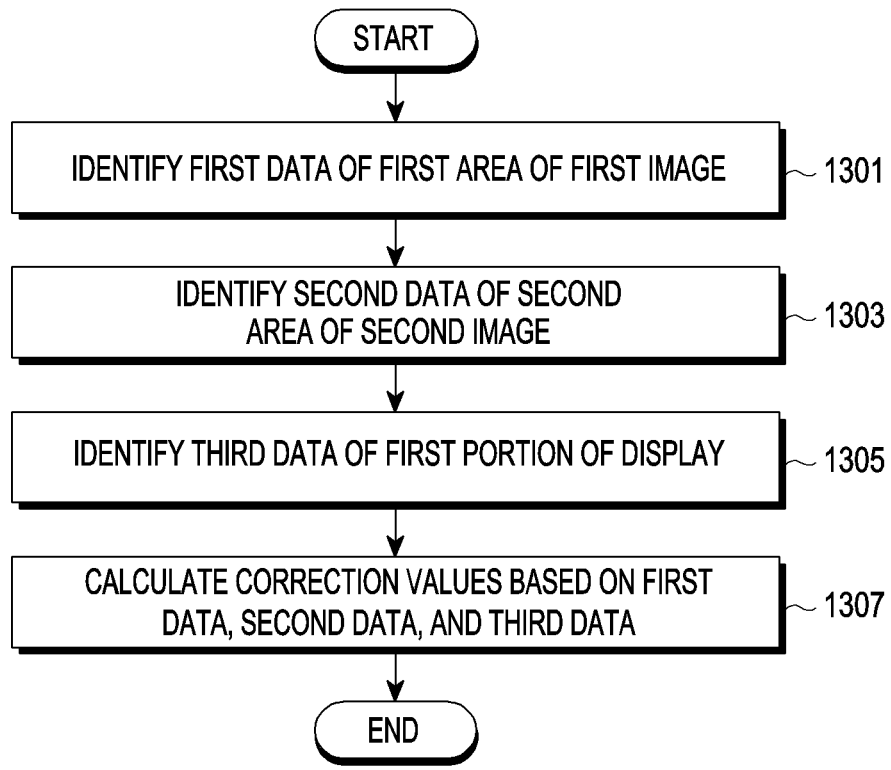
FIG. 13 is a flowchart illustrating operations of an electronic device according to certain embodiments.

FIG. 13 is a flowchart illustrating operations of an electronic device according to certain embodiments. FIG. 13 is described with reference to FIGS. 4 and 7.

Referring to FIG. 13, in operation 1301, according to certain embodiments, the electronic device 301 (e.g., the processor 120 of the electronic device 101 of FIG. 1 or the image signal processor 260 of FIG. 2) may identify first data of a first area of a first image. In operation 1303, according to certain embodiments, the electronic device 301 may identify second data of a second area of a second image, corresponding to the first area of the first image. The operation of identifying data in operations 1301 and 1303 may be understood in a similar manner as described in connection with the operations of obtaining the first image and the second image in operations 901 and 903 and comparing the first data of the first image and the second data of the second image in operation 905.

In operation 1305, according to certain embodiments, the electronic device 301 may identify third data (e.g., screen brightness and/or screen color information) of the first portion (e.g., 499 or 710) of the display 320. The data of the first portion (e.g., 499 or 710) may mean data related to a state in which a screen is displayed in the first portion (e.g., 499 or 710) or a state in which no screen is displayed. For example, in the state (e.g., active state or UDC-On state) in which a screen is displayed in the first portion (e.g., 499 or 710), the electronic device 301 may identify the value related to the type of the screen displayed in the first portion (e.g., 499 or 710), screen brightness, and/or color of the screen. For example, the electronic device 301 may identify whether a partial screen is displayed in the first portion (e.g., 499 or 710) of the display 320 in operation 1301 and/or operation 1303 and, if a partial screen is displayed in the first portion (e.g., 499 or 710) of the display 320 in at least one operation of operation 1301 or operation 1303, may identify data (e.g., screen brightness, and/or screen color information, third data) related to the partial screen displayed in the first portion (e.g., 499 or 710) of the display 320 in at least one operation of operation 1301 or operation 1303.

In operation 1305, according to certain embodiments, the electronic device 301 may calculate the correction values (e.g., R gain, G gain, and/or B gain used for white balancing), based on the first data (e.g., R level, G level, and/or B level of the first area) of the first area of the first image, the second data (e.g., R level, G level, and/or B level of the second area) of the second area of the second image corresponding to the first area of the first image, and the third data (e.g., screen brightness and/or screen color information) of the first portion (e.g., 499 or 710) of the display 320.

By providing a method for providing an image according to certain embodiments, it is possible to provide a method capable of quickly performing white balancing according to a difference between captured images caused depending on the state of the display (e.g., the display 320) using the display (e.g., the display 320) (e.g., using the display as a lens cap) in the electronic device (e.g., the electronic device 101 or the electronic device 301) including the under display camera (UDC) (e.g., the camera module 330).

By providing a method for providing an image and an electronic device (e.g., the electronic device 101 or the electronic device 301) supporting the same according to certain embodiments, it is possible to perform white balancing using the front camera (e.g., the camera module 330 (e.g., the camera facing in the direction in which the display (e.g., the display 320) of the electronic device faces).

By providing a method for providing an image and an electronic device (e.g., the electronic device 101 or electronic device 301) supporting the same according to certain embodiments, it is possible to simplify conventional complicated software processing for white balancing and to simplify the hardware device to thereby reduce the manufacturing costs of the electronic device (e.g., the electronic device 101 or electronic device 301).

It may be understood by one of ordinary skill in the art that certain embodiments described herein may be applied mutually organically within the applicable scope. For example, one of ordinary skill in the art may understand that at least some operations of an embodiment of the disclosure may be omitted and applied and that at least some operations of an embodiment and at least some operations of another embodiment may be organically combined and applied.

According to certain embodiments, an electronic device (e.g., the electronic device 301 or the electronic device 101) may comprise a display (e.g., the display 320 or the display module 160); a camera (e.g., the camera module 330 or the camera module 180) disposed under the display (e.g., the display 320 or the display module 160); and a processor (e.g., the processor 120 and/or the image signal processor 260) configured to obtain a first image (e.g., an image obtained in one state of (a) or (b) of FIG. 7 or an image obtained in one state of (a), (b), (c), (d), or (e) of FIG. 7) using the camera (e.g., the camera module 330 or the camera module 180) in a first state in which a first portion (e.g., the first portion 499 or the first portion 710) of the display (e.g., the display 320 or the display module 160) corresponding to a position where the camera (e.g., the camera module 330 or the camera module 180) is disposed is in a first mode, obtain a second image (e.g., an image obtained in the other state of (a) or (b) of FIG. 7 or an image obtained in another state of (a), (b), (c), (d), or (e) of FIG. 7) using the camera (e.g., the camera module 330 or the camera module 180) in a second state in which the first portion (e.g., the first portion 499 or the first portion 710) of the display (e.g., the display 320 or the display module 160) is in a second mode, calculate correction values, based on first data for a first area of the first image (e.g., an image obtained in one state of (a) or (b) of FIG. 7 or an image obtained in one state of (a), (b), (c), (d), or (e) of FIG. 7) and second data for a second area of the second image (e.g., an image obtained in the other state of (a) or (b) of FIG. 7 or an image obtained in another state of (a), (b), (c), (d), or (e) of FIG. 7) corresponding to the first area of the first image (e.g., an image obtained in one state of (a) or (b) of FIG. 7 or an image obtained in one state of (a), (b), (c), (d), or (e) of FIG. 7), and correct at least one image among a plurality of images obtained using the camera (e.g., the camera module 330 or the camera module 180), using the correction values. One of obtaining the first image and obtaining the second image is responsive to the other of obtaining the first image and the second image.

According to certain embodiments, the first state may be a state (e.g., the state of (a) of FIG. 7 or one state of (b), (c), (d), or (e) of FIG. 8) in which the first portion (e.g., the first portion 499 or the first portion 710) of the display (e.g., the display 320 or the display module 160) is active, and the second state may be a state (e.g., the state of (b) of FIG. 7 or the state of (a) of FIG. 8) in which the first portion (e.g., the first portion 499 or the first portion 710) of the display (e.g., the display 320 or the display module 160) is inactive.

According to certain embodiments, the processor (e.g., the processor 120 and/or the image signal processor 260) may be configured to obtain the first image (e.g., an image obtained in one state of (a) or (b) of FIG. 7 or an image obtained in one state of (a), (b), (c), (d), or (e) of FIG. 7) based on a request for executing a camera (e.g., the camera module 330 or the camera module 180) application and, after obtaining the first image (e.g., an image obtained in one state of (a) or (b) of FIG. 7 or an image obtained in one state of (a), (b), (c), (d), or (e) of FIG. 7), obtain the second image (e.g., an image obtained in the other state of (a) or (b) of FIG. 7 or an image obtained in another state of (a), (b), (c), (d), or (e) of FIG. 7).

According to certain embodiments, the processor (e.g., the processor 120 and/or the image signal processor 260) may be configured to obtain the second image (e.g., an image obtained in the other state of (a) or (b) of FIG. 7 or an image obtained in another state of (a), (b), (c), (d), or (e) of FIG. 7) based on a capture request, and after obtaining the second image (e.g., an image obtained in the other state of (a) or (b) of FIG. 7 or an image obtained in another state of (a), (b), (c), (d), or (e) of FIG. 7), obtain the first image (e.g., an image obtained in one state of (a) or (b) of FIG. 7 or an image obtained in one state of (a), (b), (c), (d), or (e) of FIG. 7).

According to certain embodiments, the processor (e.g., the processor 120 and/or the image signal processor 260) may be configured to correct the second image (e.g., an image obtained in the other state of (a) or (b) of FIG. 7 or an image obtained in another state of (a), (b), (c), (d), or (e) of FIG. 7), using the correction values.

According to certain embodiments, the processor (e.g., the processor 120 and/or the image signal processor 260) may be configured to obtain the second image (e.g., an image obtained in the other state of (a) or (b) of FIG. 7 or an image obtained in another state of (a), (b), (c), (d), or (e) of FIG. 7) according to a preset period, while the camera (e.g., the camera module 330 or the camera module 180) application is running, and after obtaining the second image (e.g., an image obtained in the other state of (a) or (b) of FIG. 7 or an image obtained in another state of (a), (b), (c), (d), or (e) of FIG. 7), obtain the first image (e.g., an image obtained in one state of (a) or (b) of FIG. 7 or an image obtained in one state of (a), (b), (c), (d), or (e) of FIG. 7).

According to certain embodiments, the processor (e.g., the processor 120 and/or the image signal processor 260) may be configured to identify third data related to a brightness and/or color of a screen displayed in the first portion (e.g., the first portion 499 or the first portion 710) in the first state (e.g., the state of (a) of FIG. 7 or one state of (b), (c), (d), or (e) of FIG. 8) in which the first portion (e.g., the first portion 499 or the first portion 710) of the display (e.g., the display 320 or the display module 160) is active and calculate the correction values, based on the first data, the second data, and the third data.

According to certain embodiments, the processor (e.g., the processor 120 and/or the image signal processor 260) may be configured to correct the at least one image by adjusting a white balance of the at least one image, based on the correction values, and wherein the correction values include an R gain, a G gain, and a B gain.

According to certain embodiments, the first data may include an R level, G level, and B level of the first area. The second data may include an R level, G level, and B level of the second area. The first area may be an area designated as a center area of the first image (e.g., an image obtained in one state of (a) or (b) of FIG. 7 or an image obtained in one state of (a), (b), (c), (d), or (e) of FIG. 7). The second area may be an area designated as a center area of the second image (e.g., an image obtained in the other state of (a) or (b) of FIG. 7 or an image obtained in another state of (a), (b), (c), (d), or (e) of FIG. 7).

According to certain embodiments, the first image (e.g., an image obtained in one state of (a) or (b) of FIG. 7 or an image obtained in one state of (a), (b), (c), (d), or (e) of FIG. 7) and the second image (e.g., an image obtained in the other state of (a) or (b) of FIG. 7 or an image obtained in another state of (a), (b), (c), (d), or (e) of FIG. 7) may be obtained using light emitted from a light source and introduced through the first portion (e.g., the first portion 499 or the first portion 710) of the display (e.g., the display 320 or the display module 160).

According to certain embodiments, a method for operating an electronic device (e.g., the electronic device 301 or the electronic device 101) including a display (e.g., the display 320 or the display module 160) and a camera (e.g., the camera module 330 or the camera module 180) disposed under the display (e.g., the display 320 or the display module 160) may comprise obtaining a first image (e.g., an image obtained in one state of (a) or (b) of FIG. 7 or an image obtained in one state of (a), (b), (c), (d), or (e) of FIG. 7) using the camera (e.g., the camera module 330 or the camera module 180) in a first state in which a first portion (e.g., the first portion 499 or the first portion 710) of the display (e.g., the display 320 or the display module 160) corresponding to a position where the camera (e.g., the camera module 330 or the camera module 180) is disposed is in a first mode, obtaining a second image (e.g., an image obtained in the other state of (a) or (b) of FIG. 7 or an image obtained in another state of (a), (b), (c), (d), or (e) of FIG. 7) using the camera (e.g., the camera module 330 or the camera module 180) in a second state in which the first portion (e.g., the first portion 499 or the first portion 710) of the display (e.g., the display 320 or the display module 160) is in a second mode, calculating correction values, based on first data for a first area of the first image (e.g., an image obtained in one state of (a) or (b) of FIG. 7 or an image obtained in one state of (a), (b), (c), (d), or (e) of FIG. 7) and second data for a second area of the second image (e.g., an image obtained in the other state of (a) or (b) of FIG. 7 or an image obtained in another state of (a), (b), (c), (d), or (e) of FIG. 7) corresponding to the first area of the first image (e.g., an image obtained in one state of (a) or (b) of FIG. 7 or an image obtained in one state of (a), (b), (c), (d), or (e) of FIG. 7), and correcting at least one image among a plurality of images obtained using the camera (e.g., the camera module 330 or the camera module 180), using the correction values. One of obtaining the first image and obtaining the second image is responsive to the other of obtaining the first image and the second image.

According to certain embodiments, the first state may be a state (e.g., the state of (a) of FIG. 7 or one state of (b), (c), (d), or (e) of FIG. 8) in which the first portion (e.g., the first portion 499 or the first portion 710) of the display (e.g., the display 320 or the display module 160) is active, and the second state may be a state (e.g., the state of (b) of FIG. 7 or the state of (a) of FIG. 8) in which the first portion (e.g., the first portion 499 or the first portion 710) of the display is inactive.

According to certain embodiments, obtaining the first image (e.g., an image obtained in one state of (a) or (b) of FIG. 7 or an image obtained in one state of (a), (b), (c), (d), or (e) of FIG. 7) may include obtaining the first image (e.g., an image obtained in one state of (a) or (b) of FIG. 7 or an image obtained in one state of (a), (b), (c), (d), or (e) of FIG. 7) based on an request for executing a camera (e.g., the camera module 330 or the camera module 180) application. Obtaining the second image (e.g., an image obtained in the other state of (a) or (b) of FIG. 7 or an image obtained in another state of (a), (b), (c), (d), or (e) of FIG. 7) may include obtaining the second image (e.g., an image obtained in the other state of (a) or (b) of FIG. 7 or an image obtained in another state of (a), (b), (c), (d), or (e) of FIG. 7) after obtaining the first image (e.g., an image obtained in one state of (a) or (b) of FIG. 7 or an image obtained in one state of (a), (b), (c), (d), or (e) of FIG. 7).

According to certain embodiments, obtaining the second image (e.g., an image obtained in the other state of (a) or (b) of FIG. 7 or an image obtained in another state of (a), (b), (c), (d), or (e) of FIG. 7) may include obtaining the second image (e.g., an image obtained in the other state of (a) or (b) of FIG. 7 or an image obtained in another state of (a), (b), (c), (d), or (e) of FIG. 7) based on a capture request. Obtaining the first image (e.g., an image obtained in one state of (a) or (b) of FIG. 7 or an image obtained in one state of (a), (b), (c), (d), or (e) of FIG. 7) may include obtaining the first image (e.g., an image obtained in one state of (a) or (b) of FIG. 7 or an image obtained in one state of (a), (b), (c), (d), or (e) of FIG. 7) after obtaining the second image (e.g., an image obtained in the other state of (a) or (b) of FIG. 7 or an image obtained in another state of (a), (b), (c), (d), or (e) of FIG. 7).

According to certain embodiments, correcting the at least one image using the correction values may include correcting the second image (e.g., an image obtained in the other state of (a) or (b) of FIG. 7 or an image obtained in another state of (a), (b), (c), (d), or (e) of FIG. 7) using the correction values.

According to certain embodiments, obtaining the second image (e.g., an image obtained in the other state of (a) or (b) of FIG. 7 or an image obtained in another state of (a), (b), (c), (d), or (e) of FIG. 7) may include obtaining the second image (e.g., an image obtained in the other state of (a) or (b) of FIG. 7 or an image obtained in another state of (a), (b), (c), (d), or (e) of FIG. 7), according to a preset period, in a state in which the camera (e.g., the camera module 330 or the camera module 180) application is running. Obtaining the first image (e.g., an image obtained in one state of (a) or (b) of FIG. 7 or an image obtained in one state of (a), (b), (c), (d), or (e) of FIG. 7) may include obtaining the first image (e.g., an image obtained in one state of (a) or (b) of FIG. 7 or an image obtained in one state of (a), (b), (c), (d), or (e) of FIG. 7) after obtaining the second image (e.g., an image obtained in the other state of (a) or (b) of FIG. 7 or an image obtained in another state of (a), (b), (c), (d), or (e) of FIG. 7).

According to certain embodiments, the method may further comprise identifying third data related to a brightness and/or color of a screen displayed in the first portion (e.g., the first portion 499 or the first portion 710) in the first state (e.g., the state of (a) of FIG. 7 or one state of (b), (c), (d), or (e) of FIG. 8) in which the first portion (e.g., the first portion 499 or the first portion 710) of the display (e.g., the display 320 or the display module 160) is active. Calculating the correction values may include calculating the correction values, based on the first data, the second data, and the third data.

According to certain embodiments, correcting the at least one image using the correction values may include correcting the at least one image, by adjusting a white balance of the at least one image, based on the correction values.

According to certain embodiments, the first data may include an R gain, G gain, and B gain of the first area. The second data may include an R gain, G gain, and B gain of the second area. The first area may be an area designated as a center area of the first image (e.g., an image obtained in one state of (a) or (b) of FIG. 7 or an image obtained in one state of (a), (b), (c), (d), or (e) of FIG. 7). The second area may be an area designated as a center area of the second image (e.g., an image obtained in the other state of (a) or (b) of FIG. 7 or an image obtained in another state of (a), (b), (c), (d), or (e) of FIG. 7).

According to certain embodiments, the first image (e.g., an image obtained in one state of (a) or (b) of FIG. 7 or an image obtained in one state of (a), (b), (c), (d), or (e) of FIG. 7) and the second image (e.g., an image obtained in the other state of (a) or (b) of FIG. 7 or an image obtained in another state of (a), (b), (c), (d), or (e) of FIG. 7) may be obtained using light emitted from a light source and introduced through the first portion (e.g., the first portion 499 or the first portion 710) of the display (e.g., the display 320 or the display module 160).

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Although certain non-limiting embodiments have been described with a degree of particularity, it shall be understood that the embodiments can be modified, where certain elements are added, omitted, or substituted without departing from the spirit and scope of the invention as set forth in the following claims, and equivalents thereof.

What is claimed is:

1. An electronic device comprising,
a display;
a camera disposed under the display; and
a processor configured to,
obtain a first image using the camera in a first state in which a first portion of the display corresponding to a position where the camera is disposed is in a first mode,
obtain a second image, using the camera in a second state in which the first portion of the display is in a second mode,
calculate correction values, based on first data for a first area of the first image and second data for a second area of the second image, wherein the second area of the second image corresponds to the first area of the first image, and
correct at least one image among a plurality of images, using the correction values,
wherein one of obtaining the first image and obtaining the second image is responsive to the other of obtaining the first image and the second image.

2. The electronic device of claim 1, wherein the first state is a state in which the first portion of the display is active, and the second state is a state in which the first portion of the display is inactive.

3. The electronic device of claim 2, wherein the processor is configured to obtain the first image based on a request for executing a camera application and, after obtaining the first image, obtain the second image.

4. The electronic device of claim 2, wherein the processor is configured to obtain the second image based on a capture request, and
after obtaining the second image, obtain the first image.

5. The electronic device of claim 4, wherein the processor is configured to correct the second image, using the correction values.

6. The electronic device of claim 2, wherein the processor is configured to obtain the second image according to a preset period, while a camera application is running, and
after obtaining the second image, obtain the first image.

7. The electronic device of claim 2, wherein the processor is configured to identify third data related to a brightness and/or color of a screen displayed in the first portion in the first state in which the first portion of the display is active and calculate the correction values, based on the first data, the second data, and the third data.

8. The electronic device of claim 1, wherein the processor is configured to correct the at least one image by adjusting a white balance of the at least one image, based on the correction values, and wherein the correction values include an R gain, a G gain, and a B gain.

9. The electronic device of claim 8,
wherein the first data includes an R level, G level, and B level of the first area,
wherein the second data includes an R level, G level, and B level of the second area,
wherein the first area is an area designated as a center area of the first image, and wherein the second area is an area designated as a center area of the second image.

10. The electronic device of claim 1, wherein the first image and the second image are obtained using light emitted from a light source and introduced through the first portion of the display.

11. A method for operating an electronic device including a display and a camera disposed under the display, the method comprising,
obtaining a first image using the camera in a first state in which a first portion of the display corresponding to a position where the camera is disposed is in a first mode,
obtaining a second image using the camera in a second state in which the first portion of the display is in a second mode,
calculating correction values, based on first data for a first area of the first image and second data for a second area of the second image, wherein the second area of the second image corresponds to the first area of the first image, and
correcting at least one image among a plurality of images obtained using the camera, using the correction values,
wherein one of obtaining the first image and obtaining the second image is responsive to the other of obtaining the first image and the second image.

12. The method of claim 11,
wherein the first state is a state in which the first portion of the display is active, and
wherein the second state is a state in which the first portion of the display is inactive.

13. The method of claim 12, wherein obtaining the first image includes obtaining the first image based on a request for executing a camera application, and
wherein obtaining the second image includes obtaining the second image after obtaining the first image.

14. The method of claim 12, wherein obtaining the second image includes obtaining the second image based on a capture request, and
wherein obtaining the first image includes obtaining the first image after obtaining the second image.

15. The method of claim 14, wherein correcting the at least one image using the correction values includes correcting the second image using the correction values.

16. The method of claim 12, wherein obtaining the second image includes obtaining the second image, according to a preset period, in a state in which a camera application is running, and
wherein obtaining the first image includes obtaining the first image after obtaining the second image.

17. The method of claim 12, further comprising identifying third data related to a brightness and/or color of a screen displayed in the first portion in the first state in which the first portion of the display is active,
wherein calculating the correction values includes calculating the correction values, based on the first data, the second data, and the third data.

18. The method of claim 11, wherein correcting the at least one image using the correction values includes correcting the at least one image, by adjusting a white balance of the at least one image, based on the correction values.

19. The method of claim 18,
wherein the first data includes an R gain, G gain, and B gain of the first area,
wherein the second data includes an R gain, G gain, and B gain of the second area,
wherein the first area is an area designated as a center area of the first image, and
wherein the second area is an area designated as a center area of the second image.

20. The method of claim 11, wherein the first image and the second image are obtained using light emitted from a light source and introduced through the first portion of the display.

* * * * *